United States Patent
McDaniel et al.

(10) Patent No.: US 6,828,268 B1
(45) Date of Patent: Dec. 7, 2004

(54) POLYMERIZATION CATALYST SYSTEMS AND PROCESSES USING ALKYL LITHIUM COMPOUNDS AS A COCATALYST

(75) Inventors: Max P. McDaniel, Bartlesville, OK (US); Joseph S. Shveima, Bartlesville, OK (US); Elizabeth A. Benham, Bartlesville, OK (US); Rolf L. Geerts, Bartlesville, OK (US); James L. Smith, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/435,113

(22) Filed: Nov. 5, 1999

(51) Int. Cl.[7] .......................... B01J 31/00; B01J 37/00; C08F 4/02; C08F 4/60
(52) U.S. Cl. ..................... 502/113; 502/110; 502/114; 502/129; 502/132
(58) Field of Search ............................... 502/113, 118, 502/117, 129, 132, 103, 110, 114

(56) References Cited

U.S. PATENT DOCUMENTS

| | | | |
|---|---|---|---|
| 3,879,368 A | 4/1975 | Johnson | 260/94.9 C |
| 3,947,433 A | 3/1976 | Witt | 260/88.2 R |
| 4,180,481 A | 12/1979 | Schulze | 252/441 |
| 4,312,967 A * | 1/1982 | Norwood et al. | 502/113 |
| 4,321,159 A * | 3/1982 | Bressler et al. | 502/113 |
| 4,328,124 A * | 5/1982 | Speca et al. | 502/113 |
| 4,368,302 A * | 1/1983 | Downs | 502/113 |
| 4,376,065 A * | 3/1983 | Shipley et al. | 502/113 |
| 4,382,020 A * | 5/1983 | Van De Leemput et al. | 502/113 |
| 4,383,939 A | 5/1983 | Johnstone | 252/429 B |
| 4,454,242 A * | 6/1984 | Ikegami et al. | 502/113 |
| 4,458,028 A * | 7/1984 | Van De Leemput et al. | 502/113 |
| 4,504,592 A * | 3/1985 | Van De Leemput et al. | 502/113 |
| 4,514,514 A | 4/1985 | Martin | 502/121 |
| 4,517,345 A * | 5/1985 | Eve et al. | 502/113 |
| 4,727,124 A * | 2/1988 | Konrad et al. | 502/113 |
| 4,728,703 A * | 3/1988 | Konrad et al. | 502/113 |
| 4,735,931 A | 4/1988 | McDaniel et al. | 502/107 |
| 4,845,176 A | 7/1989 | Konrad et al. | 526/105 |
| 5,032,651 A * | 7/1991 | McDaniel et al. | 502/113 |
| 5,155,186 A | 10/1992 | Hogan et al. | 526/106 |
| 5,183,868 A * | 2/1993 | Nordquest | 502/132 |
| 5,189,000 A * | 2/1993 | Masi et al. | 502/113 |
| 5,198,400 A * | 3/1993 | Katzen et al. | 502/113 |
| 5,237,025 A * | 8/1993 | Benham et al. | 502/113 |
| 5,330,950 A * | 7/1994 | Hsieh | 502/113 |
| 5,401,816 A * | 3/1995 | Hsieh et al. | 502/113 |
| 5,508,362 A * | 4/1996 | Rollmann et al. | 502/113 |
| 5,648,439 A * | 7/1997 | Bergmeister et al. | 502/113 |
| 5,654,249 A * | 8/1997 | Rollmann et al. | 502/113 |
| 5,723,399 A * | 3/1998 | Takemoto et al. | 502/113 |
| 6,096,679 A * | 8/2000 | Lonfils et al. | 502/152 |
| 6,174,981 B1 | 1/2001 | Bergmeister et al. | |
| 6,194,528 B1 * | 2/2001 | Debras | 502/242 |
| 6,204,346 B1 * | 3/2001 | Bergmeister et al. | 502/232 |
| 6,214,947 B1 * | 4/2001 | Debras et al. | 502/171 |
| 6,245,869 B1 * | 6/2001 | Debras et al. | 502/117 |

* cited by examiner

Primary Examiner—Mark L. Bell
Assistant Examiner—J. Pasterczyk
(74) Attorney, Agent, or Firm—Womble Carlyle Sandridge & Rice PLLC

(57) ABSTRACT

A catalyst system composition comprising a chromium compound supported on a silica-titania support, wherein said catalyst system has been reduced with carbon monoxide, and a cocatalyst selected from the group consisting of i) alkyl lithium compounds, ii) dialkyl aluminum alkoxides in combination with at least one metal alkyl selected from the group consisting of alkyl zinc compounds, alkyl aluminum compounds, alkyl boron compounds, and mixtures thereof and iii) mixtures thereof can be used to polymerize olefins to produce a low density polymer with a decreased melt index and/or high load melt index. This catalyst system also can be used with a Ziegler-Natta catalyst system to polymerize olefins. Polymerization processes using these catalyst system compositions are also provided. Polymers resulting from polymerization processes using the inventive catalyst and cocatalyst systems have a decreased high load melt index, decreased melt index, increased fluff bulk density, and are useful as components to make bi-modal molecular weight resins for film and/or blow molding applications.

10 Claims, No Drawings

POLYMERIZATION CATALYST SYSTEMS AND PROCESSES USING ALKYL LITHIUM COMPOUNDS AS A COCATALYST

BACKGROUND OF THE INVENTION

This invention relates to the polymerization of mono-1-olefins, such as ethylene, using a catalyst system comprising a supported chromium oxide catalyst and an alkyl lithium cocatalyst.

It is well known that mono 1-olefins, such as ethylene, can be polymerized with catalyst systems employing vanadium, chromium or other metals an inorganic oxide supports such as alumina, silica, aluminophosphate, titania, zirconia, magnesia and other refractory metals. These catalyst systems can be used to prepare olefin polymers in a hydrocarbon solution to give a product having excellent characteristics from many standpoints. Supported chromium oxide catalyst systems also can be used to prepare olefin polymers in slurry polymerization systems wherein the polymer is produced in the form of small particles of solid material suspended in a diluent. This process, frequently referred to as a particle-form process, has an advantage of being less complex.

However, certain control operations which are easily carried out in a solution process are considerably more difficult in a particle-form, or slurry, process. For instance, in a solution process, polymer melt index and/or high load melt index can be varied by changing reactor temperature. Usually a lower melt index can be obtained by decreasing reactor temperature. However, in a slurry process this technique is inherently limited since efforts to decrease melt index and/or high load melt index to any appreciable extent by decreasing reactor temperature can decrease production rates and decrease catalyst activity. Also, fluff bulk density is related to reactor temperature, and lowering the reactor temperature excessively can result in poor bulk density and a high level of fines. Polymers having a high fluff bulk density and a low melt index and/or high load melt index are useful for applications as pipe and drum polymers and/or film polymers. Cr/silica-titania catalysts are preferred for this application, especially when CO treated so that they will produce their own hexene monomer. Unfortunately, however, when such catalysts are used with trialkyl boranes according to prior art, the melt index becomes too high for easy reactor control and good bulk density.

Polymers having a bimodal molecular weight distribution, produced either in the same reactor or by blending two different molecular weight polymers, are especially desirable for use in pipe and drum applications, as well as film applications. Producing such bimodal polymers by adding two catalysts into one reactor can be more economical and practical than blending polymers. But it is difficult to find catalysts capable of producing both extremely high and extremely low molecular weight under the same reactor conditions, and also which incorporate hexene well and poorly respectively. Cr/silica-titania catalysts are particularly good for the high molecular catalyst component when used with a titanium chloride based Ziegler catalyst for the lower molecular weight component. Cr/Silica-titania incorporates hexene very efficiently when CO reduced and when it has a high pore volume. However, such chromium catalysts do not produce a high enough molecular weight when run with hydrogen and trialkyl boranes under conditions that allow the other component to produce low molecular weight polymer.

SUMMARY OF THE INVENTION

Therefore, it is an object of this invention to provide an improved catalyst and cocatalyst system to selectively reduce melt index and/or high load melt index of a polymer product.

It is yet another object of this invention to provide an improved olefin polymerization process.

It is still another object of this invention to provide an improved olefin polymer.

In accordance with one embodiment of this invention, a catalyst system composition comprising a chromium compound supported on a silica-titania support, wherein said catalyst system has been reduced with carbon monoxide, has a pore volume of greater than 1.8 cc/g and a surface area of greater than 400 square meters per gram, and a cocatalyst selected from the group consisting of i) alkyl lithium compounds, ii) dialkyl aluminum alkoxides in combination with at least one metal alkyl selected from the group consisting of alkyl zinc compounds, alkyl aluminum compounds, alkyl boron compounds, and mixtures thereof and iii) mixtures thereof can be used to polymerize olefins to produce a low density polymer with a decreased melt index and/or high load melt index.

In accordance with another embodiment of this invention, a polymerization process utilizing a novel catalyst and cocatalyst system is provided.

In accordance with yet another embodiment of this invention, a polymerization process utilizing the novel catalyst and cocatalyst system in combination with a Ziegler-Natta catalyst system is provided to produce a novel high performance polymer.

DESCRIPTION OF THE PREFERRED EMBODIMENTS

Catalyst Systems

As used in this disclosure, the term "support" refers to a carrier for another catalytic component. However, by no means, is a support necessarily an inert material; it is possible that a support can contribute to catalytic activity and selectivity.

In the description herein, the terms "cogel" and "cogel hydrogel" are arbitrarily used to describe cogelled silica and titania. The term "tergel" is used to describe the product resulting from gelation together of silica, titania, and chromium. References to "silica" mean a silica-containing material generally composed of 80 to 100 weight percent silica, the remainder, if any, being selected from alumina, boria, magnesia, thoria, zirconia, or mixtures thereof. Other ingredients which do not adversely affect the catalyst or which are present to produce some unrelated results can also be present.

The support for the catalyst system of this invention must be a high pore volume cogel of silica and a titanium compound. Such a cogel hydrogel can be produced by contacting an alkali metal silicate such as sodium silicate with an acidic material such as an acid, carbon dioxide, or an acidic salt. The preferred procedure is to utilize sodium silicate and an acid such as sulfuric acid, hydrochloric acid, or acetic acid with sulfuric acid being most preferred due to less corrosivity and greater acid strength. The titanium component must be coprecipitated with the silica and thus most conveniently the titanium compound will be dissolved in the acid or alkali metal silicate solution.

The titanium compound preferably is incorporated with the acid. The titanium compound can be incorporated in the acid in any form in which it will be subsequently incorporated in the silica gel formed on combination of the silicate and the acid (preferably by means of adding the silicate to the acid) and from which form it is subsequently convertible to titanium oxide on calcination. Suitable titanium compounds include, but are not limited to the halides such as $TiCl_3$ and $TiCl_4$, the nitrates, the sulfates, the oxalates and alkyl titanates. In instances where carbon dioxide is used, the titanium, of course, must be incorporated into the alkali metal silicate itself. Also, when using acidic salts it is preferred to incorporate the titanium compound in the alkali metal silicate and in such instances the preferred titanium compounds are water soluble materials which do not precipitate the silicate, i.e. are those convertible to titanium oxide on calcination such as, for example, $K_2TiO(C_2O_4) \cdot H_2O$ (titanium potassium oxalate); $(NH_4)_2TiO(C_2O_4)_2 \cdot H_2O$; and $Ti_2(C_2O_4)_3 \cdot H_2O$.

The titanium compound preferably is present in an amount within a range of about 0.1 to about 7, preferably about 1 to about 5, and most preferably about 2 to about 5 weight percent, calculated as titanium, based on the weight of the cogel. The preferred titanium ranges result in a catalyst systems that can have improved activity and produce a higher melt index polymer.

The catalyst component must be a chromium compound. The chromium component can be combined with the support component in any manner known in the art, such as forming a co-precipitated tergel. Alternatively, an aqueous solution of a water soluble chromium component can be added to a hydrogel of the support component. Suitable chromium compounds include, but are not limited to, chromium nitrate, chromium acetate, and chromium trioxide. Alternatively, a solution of a hydrocarbon soluble chromium component, such as tertiary butyl chromate, a diarene chromium compound, biscyclopentadienyl chromium(II) or chromium acetylacetonate, can be used to impregnate a xerogel support, which results from removal of water from the hydrogel.

The chromium component is used in an amount sufficient to give about 0.05 to about 5, preferably about 0.5 to about 2 weight percent chromium based on the total weight of the chromium and support after activation.

The resulting chromium component on the support component is then subjected to activation, or calcination, in an oxygen-containing ambient in any manner conventionally used in the art. Because of economy, the preferred oxygen-containing ambient is air, preferably dry air. Activation is carried out at an elevated temperature for about thirty minutes to about 50 hours, preferably about 2 hours to about 10 hours, usually at a temperature within a range of about 400° C. to about 900° C. Under these calcination conditions, at least a substantial portion of any chromium in a lower valence state is converted to a hexavalent form.

After calcination, the supported catalyst system then is cooled and must be subjected to at least a partial reduction of the hexavalent chromium to a lower valence state prior to contacting the cocatalyst compound contacting an alkyl lithium compound. Preferably, a substantial portion of the chromium will be in the divalent state (Cr(II)) after the reduction process.

Any compound capable of reducing chromium(VI) to chromium(II) can be used as a reducing agent. Most preferably, the reducing agent is carbon monoxide, due to ready availability, ease of use and safety. The reducing agent can be employed at temperatures between about 300° C. to about 500° C., although it is more often employed at temperatures in a range of about 350° C. to about 450° C. The partial pressure of the reducing gas in the reduction operation can be varied from sub-atmospheric pressures to relatively high pressures, but the simplest reducing operation is to utilize a dilute solution of a pure reducing agent at about atmospheric pressure. Usually, a solution of about 10%, by volume, carbon monoxide in an inert ambient, such as, for example, nitrogen and/or argon can be used.

The reduction time can vary from a few minutes to several hours or more. The extent of reduction can be followed by visual inspection of catalyst system color. The color of the initial oxygen-activated catalyst system is generally orange, indicating the presence of hexavalent chromium. The color of the reduced catalyst system employed in the invention is blue, indicating that all, or substantially all, of the initial hexavalent chromium has been reduced to lower oxidation states, generally the divalent state.

The course of reduction action of the air-activated orange catalyst with the reducing agent can be determined exactly by pulse titration. A known amount of reducing agent is added per pulse and the amount of evolved oxidized reducing agent is measured. When reduction is complete, only reducing agent will be present and the catalyst system is blue or green in color. The reduced catalyst can be titrated with pulses of oxygen or any oxidizing agent, to convert the catalyst to the original orange color. When oxidation is complete, the oxidizing agent will be evident in the off-gas.

After reduction, the reduced, supported catalyst system is cooled to about room temperature, e.g., about 25° C., in an inert atmosphere, such as argon or nitrogen, to flush out the reducing agent. After the flushing treatment, the catalyst is kept away from contact with either a reducing agent or an oxidizing agent.

Supported chromium catalyst system concentrations in the reactor are conventional and are usually within a range of about 0.001 to about 10 weight percent, based on the weight of active chromium component and the weight of the reactor contents.

The supported chromium catalyst of this invention must be one of high porosity. It must have a pore volume, as measured by nitrogen sorption, of at least 1.8 cc/g, preferably greater than 2.0 cc/g, and most preferably greater than 2.2 cc/g. It must have a surface area, as measured by the BET method, of at least 400 square meters per gram, preferably greater than 450 square meters per gram, and most preferably greater than 500 square meters per gram.

In another embodiment of this invention, a supported chromium catalyst system, as described above, can be used with a Ziegler-Natta catalyst system to produce a bimodal polymer product. As used in this disclosure, Ziegler-Natta catalyst systems are defined as a titanium, vanadium and/or zirconium-containing catalyst systems. Commercially available titanium, vanadium and/or zirconium-containing catalyst systems typically comprise complexes of transition metal halides with organometallic compounds. Exemplary magnesium/titanium catalyst systems include, but are not limited to, those disclosed in U.S. Pat. Nos. 44,394,291; 4,326,291; and 4,347,158, herein incorporated by reference.

The two catalyst systems can be used together, as is known in the art, either simultaneously in one reactor, in a series of reactors, as known in the art, or in two reactors in parallel, in order to produce a bimodal polyolefin product. The amounts of each catalyst system used can be varied in order to achieve the desired bimodal polymer properties.

Cocatalyst

The supported chromium catalyst systems, as described above, must be used with a cocatalyst. Cocatalysts useful in the present invention are selected from the group consisting of i) alkyl lithium compounds, ii) dialkyl aluminum alkoxides in combination with at least one metal alkyl selected from the group consisting of alkyl zinc compounds, alkyl aluminum compounds, alkyl boron compounds, and mixtures thereof and iii) mixtures thereof in order to decrease the melt flow characteristics of the resultant polymer. As used in this disclosure, the term "dialkyl aluminum alkoxide cocatalyst system" refers to use of dialkyl aluminum alkoxides in combination with at least one metal alkyl selected from the group consisting of alkyl zinc compounds, alkyl aluminum compounds, alkyl boron compounds, and mixtures thereof.

Preferred alkyl lithium compounds are hydrocarbyl lithium compounds, particularly those having an alkyl group comprising from about 1 to about 12 carbon atoms, preferably, from about 2 to about 8 carbon atoms. Most preferably, the alkyl lithium compounds will have from 2 to 5 carbon atoms per alkyl group for best reactivity and desired decrease of the resultant polymer melt index. Exemplary lithium compounds, include but are not limited to, n-butyl lithium, propyl lithium, and ethyl lithium. Aryl lithium compounds, such as phenyl lithium, are also suitable.

The lithium cocatalyst can be used in an amount so as to give the atom ratio of lithium metal to active chromium catalyst component within a range of about 0.5:1 to about 10:1, preferably from about 2:1 to about 5:1. Based on the solvent or diluent employed during polymerization, if any, the amount of lithium compound cocatalyst is generally within a range of about 0.5 to about 20, preferably about 2 to about 10 parts by weight per million parts by weight of the diluent (ppm or mg/kg), wherein these amounts are based on the total reactor contents in instances where no solvent or diluent is utilized. Most preferably, the lithium cocatalyst is present within a range of 2 to 8 parts per million, based on the total reactor contents. Amounts higher or lower than those disclosed do not offer any additional benefit in melt index or high load melt index reduction.

The lithium cocatalyst can be either pre-mixed with the chromium catalyst system or introduced directly into the reactor as a separate stream, the latter being the preferred procedure for ease of catalyst system preparation and handling.

In another embodiment of the present invention, dialkyl aluminum alkoxides wherein the alkyl group can be the same or different and has from about one to about ten, preferably about two to about four, carbon atoms per alkyl group, can be used as a cocatalyst either with or without an alkyl lithium compound in order to decrease the melt index (MI) of low density polymers during the production of these low density polymers. The most preferred dialkyl aluminum alkoxide is diethylaluminum ethoxide (DEALE), due to ease of use and availability. However, the dialkyl aluminum alkoxide must be used with at least one other metal alkyl, selected from the group consisting of zinc compounds, alkyl aluminum compounds, alkyl boron compounds, and mixtures thereof.

The alkyl zinc compound can be any alkyl zinc compound that, when used in combination with an alkyl aluminum ethoxide, can decrease the melt index on low density polymers. Exemplary alkyl zinc compounds include zinc compounds of the formula $ZnR'_nX_{2-n}$ where X is a hydride or halide, R' is a 1 to 12 carbon atom hydrocarbyl radical and n is an integer of 1 or 2. Diethyl zinc (DEZ) is particularly suitable, based on ease of use and availability, as well as best resultant polymer properties.

The alkyl aluminum compound can be any alkyl aluminum compound that, when used in combination with a dialkyl aluminum alkoxide, can decrease the melt index on low density polymers. Exemplary alkyl aluminum compounds include aluminum compounds of the formula $AlR'_nX_{3-n}$ where X is a hydride or halide, R' is a 1 to 12 carbon atom hydrocarbyl radical and n is an integer of 1 to 3. Triethylaluminum (TEA) and diethylaluminum chloride (DEAC) are particularly suitable, with TEA being the most preferred alkyl aluminum compound based on ease of use and availability.

The alkyl boron compound can be any alkyl boron compound that, when used in combination with an alkyl aluminum ethoxide, can decrease the melt index on low density polymers. If the cocatalyst is an alkyl boron compound, trihydrocarbylboron compounds are preferred and trialkyl boron compounds are most preferred. Preferably, the alkyl groups have from about 1 to about 12 carbon atoms and preferably, from 2 to 5 carbon atoms per alkyl group. Trialkyl boron compounds, such as, for example, tri-n-butyl borane, tripropylborane, and triethylborane (TEB) are preferred cocatalysts because these compounds are effective agents that also can improve polymer properties, such as, for example, to reduce melt flow and retard polymer swelling during polymerization. Other suitable boron compounds include trihydrocarbyl boron compounds broadly; triaryl boron compounds, such as, for example, triphenylborane; boron alkoxides, such as, for example, $B(OC_2H_5)_3$; and halogenated alkyl boron compounds, such as, for example, $B(C_2H_5)Cl_2$. By far, the most preferred cocatalyst is triethylborane (TEB), for the reasons given above.

The most preferable dialkyl aluminum alkoxide cocatalyst system is a DEALE/DEZ combination in order to further lower the resultant polymer density as well as reduce the MI potential of the resin.

The dialkyl aluminum alkoxide cocatalyst system can be used in any amount so as to reduce the melt index and the density of the resultant polymer product. Generally, based on solvent or diluent employed during polymerization, the amount of dialkyl aluminum alkoxide cocatalyst generally is within a range of about 0.5 to about 20, preferably about 2 to about 10 parts per million by weight of diluent (ppm or mg/kg), or wherein these amounts are based on total reactor contents in instances where no solvent or diluent is utilized. Most preferably the dialkyl aluminum alkoxide cocatalyst system is present in the reactor within a range of about 2 to about 8 parts per million, based on total reactor contents. For clarification, the amount of dialkyl aluminum alkoxide cocatalyst system includes the total mass of both the dialkyl aluminum alkoxide cocatalyst and the additional metal alkyl, selected from the group consisting of alkyl zinc compounds, alkyl aluminum compounds, alkyl boron compounds, and mixtures thereof. Amounts higher or lower than these disclosed do not offer any additional benefit in melt index or high load melt index reduction.

The dialkyl aluminum alkoxide cocatalyst system can be either premixed with the chromium catalyst system or introduced directly into a reactor as a separate stream, the latter being the preferred procedure for ease of catalyst system preparation and handling.

Reactants

Reactants applicable for use with the catalyst systems and processes of this invention are olefinic compounds which can polymerize, i.e., react, with other olefinic compounds. The catalyst systems of the invention can be used to polymerize at least one mono-1-olefin having from 2 to about 8 carbon atoms per molecule. Exemplary compounds include, but are not limited to, ethylene, propylene, 1-butene, 1-pentene, 1-hexene, 1-octene, and mixtures thereof.

This invention is of particular applicability in producing ethylene homopolymers and copolymers from mixtures of ethylene and about 0.5 to about 20 mole percent of one or more comonomers selected from the group consisting of mono-1-olefins having from about 3 to about 8 carbon atoms per molecule. Exemplary comonomers include, but are not limited to, aliphatic alpha-olefins, such as propylene, 1-butene, 1-pentene, 1-hexene, 1-octene, 4-methyl-1-pentene and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably about 97 to about 99.6 weight percent polymerized ethylene units. Propylene, 1-butene, 1-pentene, 1-hexene and 1-octene are especially preferred comonomers for use with ethylene due to availability, ease of use and ready incorporation into the polymer.

The presence of comonomer has a tendency to increase melt flow. Hence, the use of only a small amount of comonomer, say 0.001 to 0.3, preferably 0.01 to 0.1 mole percent in the feed is preferred.

Reaction Conditions

Polymerization can be carried out in any manner known in the art, such as gas phase, solution or slurry conditions, to effect polymerization. A stirred reactor can be utilized for a batch process, or the reaction can be carried out continuously in a loop reactor or in a continuous stirred reactor.

A preferred polymerization technique is that which is referred to as a particle-form, or slurry, process wherein the temperature is kept below the temperature at which polymer goes into solution. Such polymerization techniques are well known in the art and are disclosed, for instance, in Norwood, U.S. Pat. No. 3,248,179, the disclosure of which is hereby incorporated by reference.

The preferred temperature in the particle form process is within a range of about 150° F. to about 230° F. (66° C. to 110° C.). Reactor pressure usually can be within a range of about 300 to about 700 psig and preferably are within a range of 400 to 600 psig, for best reactor operating parameters. Two preferred polymerization methods for the slurry process are those employing a loop reactor of the type disclosed in Norwood and those utilizing a plurality of stirred reactors either in series, parallel or combinations thereof wherein the reaction conditions, and/or catalyst systems, are different in the different reactors. For instance, in a series of reactors, a chromium catalyst system which has not been subjected to a reduction step can be utilized either before or after the reactor utilizing the catalyst system of this invention. In another specific instance, a conventional chromium oxide on a predominantly silica support catalyst system can be utilized in a reactor in parallel with a reactor utilizing a catalyst system of this invention and the resulting polymerization influence combined prior to recovering the polymer.

Commonly used polymerization cocatalysts cannot be used. The use of alkyl boron compounds are known in the art to increase melt index and/or high load melt index, thus negating the desired result of this invention. A decreased melt index and/or high load melt index is desirable to allow maximum reactor temperature which can improve polymer bulk density.

The molecular weight of the polymer can be controlled by various means known in the art such as adjusting the temperature (higher temperature giving lower molecular weight) and introducing additional hydrogen to lower the molecular weight or varying the catalyst system compounds.

Polymer Characteristics

The polymers produced in accordance with this invention have reduced density, broadened molecular weight distribution especially on the low molecular weight side, decreased MI and decreased HLMI. This catalyst system composition is most preferably applicable for use with ethylene polymerization. As used in this disclosure, the term "polymer" includes both homopolymers and copolymers.

When used as a single component catalyst, the addition of an alkyl lithium cocatalyst to the catalyst of this invention can produce a polymer with a density within a range of about 0.925 to about 0.960 g/cc, and preferably within a range of about 0.945 to about 0.954 g/cc. The high load melt index (HLMI) of the resultant polymer usually is within a range of about 1 to about 20 g/10 minutes, and preferably within a range of about 5 to about 15 g/10 minutes. Polymers having characteristics within the given ranges are especially useful for blow molding applications and/or film production. The resultant polymers also be can blended, in any manner, with other polymers to produce a bi-modal polymer which also can be used for blow-molding applications and/or film production.

When used with a Ziegler-Natta catalyst systems as one component of a dual catalyst system, reaction conditions are adjusted so that the chromium catalyst will produce a lower high load melt index and lower density. However, the resultant mixture of the two components yields a novel bimodal polymer having a density within a range of about 0.925 to about 0.960 g/cc, and preferably within a range of about 0.945 to about 0.954 g/cc. The high load melt index (HLMI) of the resultant polymer usually is within a range of about 1 to about 20 g/10 minutes, and preferably within a range of about 5 to about 15 g/10 minutes.

EXAMPLES

The following examples illustrate various aspects of the invention. Data are included for each example about the polymerization conditions, as well as the resultant polymer. Analyses of the resultant polymers were conducted according to the following procedures:

A "Quantachrome Autosorb-6 Nitrogen Pore Size Distribution Instrument" was used to determined the surface area and pore volume of the supports. This instrument was acquired from the Quantachrome Corporation, Syosset, N.Y.

Density (g/ml)—ASTM D 1505-68 and ASTM D 1928, Condition C. Determined on a compression molded sample, cooled at about 15° C. per minute, and conditioned at room temperature for about 40 hours.

Fluff Bulk Density (g/ml)—ASTM D 1895, the apparent density test.

High Load Melt Index (HLMI)(g/10 min)—ASTM D 1238. Determined at 190° C. with a 21,600 gram weight.

Melt Index (M)(g/10 min)—ASTM D 1238. Determined at 190° C. with a 2,160 gram weight.

Example 1

This example shows the desirable effect of an alkyl lithium cocatalyst on chromium catalyst. In this series of experiments, the catalyst system was a high porosity silica-titania available from W. R. Grace Co. as 964 Magnapore® catalyst. It contained from 3.4 to 3.9 weight percent (wt %) titanium, 1 wt % chromium and had a surface area of 550 m$^2$/g and a pore volume of 2.2 cc/g. For the following runs, the catalyst was calcined in fluidizing dry air at 650° C. for three hours, flushed with dry nitrogen, then reduced in carbon monoxide at 350° C. for half an hour, then flushed again at 350° C. with nitrogen.

Polymerization runs were carried out in a 2.2 liter, stirred autoclave equipped with jacket for precise temperature control. First, about 0.07 grams of the above catalyst system was charged under nitrogen to the reactor. Then one liter of liquid isobutane diluent was added and during this addition the specified amount of cocatalyst solution, either n-butyl lithium (BuLi), as taught is a good candidate for in-situ branch generation, were added. Next, ethylene was added to bring the total reactor pressure to 550 psig. Ethylene was supplied on demand to maintain this pressure for about an hour. Afterward, diluent was flashed off by releasing the pressure; the autoclave was opened and the resultant polymer recovered, usually around 100–200 grams. For these experiments, the reactor temperature was held constant at 95° C.

Table 1 shows the results. Notice that when TEB is used as the cocatalyst, polymer density decreases and this is believed to be caused by in-situ generation of comonomers, causing branching along the polymer chain, a very desirable result. Notice, that BuLi also enables in-situ branching and results in a similar suppression of density. In contrast to the TEB runs, however, BuLi causes a marked depression in the melt index (MI) and a high load melt index (HLMI), which is a very desirable result, especially when used in a two component catalyst blend for broad molecular weight distribution bimodal resins. It is also noted that if one compares, or even graphs, the observed HLMI against density for these Runs, the comparison is contrary to what is common in the art. Usually, NH or HLMI increases for any catalyst system as the density is decreased; however, the data for this invention show otherwise. Notice that the BuLi Runs are much lower in HLMI than the TEB runs.

Example 2

This example demonstrates the desirable effect of DEALE mixtures. These experiments used the same high porosity silica-titania catalyst and the same reactor and polymerization conditions as that described in Example 1, only the cocatalyst was different. Instead of using TEB or BuLi as described in Example 1, diethylaluminum ethoxide (DEALE) was used. Use of DEALE as a cocatalyst also can result in in-situ branching and therefore polymer density suppression. This density suppression can be seen in Runs 201–206 in Table 2, which lists the results of polymerization runs using only DEALE cocatalyst in the amounts shown. Similar to BuLi, DEALE tends to suppress the melt index. Unfortunately, DEALE also suppresses the activity of the catalyst, as seen in Table 2.

Runs 207–210 show the effect of using only diethyl zinc (DEZ) as cocatalyst in various amounts. Notice that DEZ may yield good activity but it does not generate significant in-situ branching, as evidenced by minimal or no reduction in polymer density. Runs 211 and 212 of Table 2 show the effect of only triethyl aluminum (TEA) as a cocatalyst with this catalyst system. Again, the density is not lowered significantly, and catalyst system activity is not enhanced. Larger amounts of TEA seem to diminish catalyst system activity.

Runs 213–218 of Table 2, however, which is a second embodiment of this invention, show the effect of using a dialkyl aluminum alkoxide in combination with at least one metal alkyl selected from the group consisting of alkyl zinc compounds, alkyl aluminum compounds, alkyl boron compounds, and mixtures thereof and iii) mixtures. Notice that not only are the density and HLMI reduced, but catalyst system activity was not diminished. The DEALE/DEZ combination was particularly effective in that it lowered density to 0.938 (vs 0.943 for TEB alone), has comparable activity to TEB (2600 gPE/gcat/h), but provided a much lower HLMI (2 vs>15 for TEB). These results are again shown graphically in FIG. 1.

TABLE 1

EFFECT OF LITHIUM

| Run Number | Catalyst Charged (grams) | Cocatalyst Charged (ppm) | Polymer Formed (grams) | Activity (gPE/gcat/h) | MI (g/10 min) | HLMI (g/10 min) | Shear Response (HLMI/MI) | Density (g/cc) |
|---|---|---|---|---|---|---|---|---|
| 101 | 0.1110 | 5 ppm BuLi | 226 | 2715 | 0.05 | 5.5 | 101 | 0.956 |
| 102 | 0.1192 | 17 ppm BuLi | 387 | 3975 | 0.20 | 10.9 | 54 | 0.934 |
| 103 | 0.1266 | 19 ppm BuLi | 345 | 3479 | 0.28 | 14.4 | 51 | 0.932 |
| 104 | 0.1010 | 10 ppm TEB | 202 | 2609 | 0.15 | 10.6 | 72 | 0.948 |
| 105 | 0.1011 | 10 ppm TEB | 84 | 997 | 0.11 | 10.6 | 96 | 0.942 |
| 106 | 0.1196 | 10 ppm TEB | 147 | 1639 | 0.11 | 12.7 | 115 | 0.946 |
| 107 | 0.0751 | 10 ppm TEB | 269 | 4776 | 0.24 | 15.2 | 64 | 0.933 |
| 108 | 0.1134 | 10 ppm TEB | 298 | 3285 | 0.19 | 15.4 | 82 | 0.949 |
| 109 | 0.1029 | 10 ppm TEB | 127 | 1610 | 0.18 | 15.9 | 987 | 0.948 |
| 110 | 0.0738 | 10 ppm TEB | 290 | 5239 | 0.26 | 16.2 | 63 | 0.936 |

TABLE 2

EFFECT OF DEALE

| Run | Catalyst Charged (grams) | Cocatalyst Charged (ppm) | Polymer Formed (grams) | Activity (gPE/gcat/h) | MI (g/10 min) | HLMI (g/10 min) | Shear Response (HLMI/MI) | Density (g/cc) |
|-----|-----|-----|-----|-----|-----|-----|-----|-----|
| 201 | 0.1210 | 4 ppm DEALE | 145 | 1310 | 0.03 | 2.6 | 99 | 0.946 |
| 202 | 0.0845 | 5 ppm DEALE | 58 | 1370 | 0.08 | 4.5 | 57 | 0.937 |
| 203 | 0.0904 | 7 ppm DEALE | 75 | 905 | 0.04 | 4.1 | 109 | 0.955 |
| 204 | 0.0835 | 10 ppm DEALE | 76 | 1210 | 0.06 | 5.7 | 101 | 0.950 |
| 205 | 0.0984 | 15 ppm DEALE | 26 | 288 | 0.03 | 3.4 | 108 | 0.957 |
| 206 | 0.0939 | 15 ppm DEALE | 43 | 528 | 0.04 | 4.5 | 129 | 0.956 |
| 207 | 0.1001 | 3 ppm DEZ | 140 | 1750 | 0.00 | 2.0 | — | 0.957 |
| 208 | 0.0801 | 5 ppm DEZ | 307 | 5000 | 0.00 | 1.4 | — | 0.956 |
| 209 | 0.0890 | 5 ppm DEZ | 258 | 3700 | 0.02 | 3.0 | 131 | 0.957 |
| 210 | 0.0829 | 10 ppm DEZ | 230 | 3620 | 0.02 | 3.0 | 156 | 0.957 |
| 211 | 0.0942 | 5 ppm TEA | 171 | 2180 | 0.01 | 2.4 | 176 | 0.950 |
| 212 | 0.0983 | 10 ppm TEA | 75 | 974 | 0.08 | 8.2 | 99 | 0.944 |
| 213 | 0.0858 | 3 ppm DEALE 3 ppm DEZ | 112 | 2610 | 0.02 | 2.3 | 123 | 0.938 |
| 214 | 0.0653 | 3 ppm DEALE 3 ppm TEA | 100 | 2420 | 0.11 | 7.7 | 70 | 0.935 |
| 215 | 0.0952 | 5 ppm DEALE 5 ppm TEA | 98 | 1370 | 0.05 | 5.3 | 103 | 0.951 |
| 216 | 0.0807 | 3 ppm DEALE 3 ppm TEB | 74 | 1830 | 0.02 | 2.1 | 89 | 0.936 |
| 217 | 0.0771 | 3 ppm DEALE 3 ppm TEB | 43 | 1120 | 0.23 | 17.8 | 79 | 0.928 |
| 218 | 0.1085 | 5 ppm DEALE 5 ppm TEB | 76 | 914 | 0.11 | 10.7 | 101 | 0.948 |

Example 3

This example teaches use of a dual catalyst system. The chromium catalyst system was a high porosity silica-titania available from W. R. Grace Co. under the name of 963 Magnapore. It contained 2.5% titania and 1% chromium and had a pore volume of 2.4 cc/g and a surface area of about 520 m$^2$/g. The catalyst system was calcined in fluidizing dry air at 650° C. for three hours, then flushed with nitrogen and cooled to 350° C., where the catalyst system was treated in dry carbon monoxide for half an hour.

The Ziegler-Natta catalyst system used was a titanium-magnesium chloride type catalyst commercially available from Catalyst Resources, Inc. under the name of Lynx®-100. The Lynx®-100 catalyst system was slurried in n-heptane, so that small amounts (0.02 g/5 mls) could be charged to the reactor more accurately.

Polymerization runs were carried out in a 2.2 liter stirred autoclave equipped with jacket for precise temperature control. First, one or more catalyst systems were charged under nitrogen to the reactor. Then, one liter of liquid isobutane diluent, 20 mls of dry 1-hexene, one half ml of 1 wt % TEA solution, and 0.8 ml of 1 wt % BuLi were added. Next, 50 psi of hydrogen gas was added to the reactor, and finally ethylene was added to bring the total pressure up to 550 psig. Ethylene then was supplied on demand to maintain this pressure for about one hour. Afterward, the diluent was flashed off by releasing the pressure; the autoclave was opened and the resultant polymer recovered. Reactor temperature was held constant at 90° C., TEA concentration in the diluent was 5 ppm, the butyl lithium concentration in the diluent was 8 ppm, and the 1-hexene concentration in the diluent was about 2 wt %.

Results of these experiments are shown in Table 3. As can be seen from the densities and high load melt indices, the combination of Ziegler-Natta and chromium catalyst systems, in Run 303 indicates that the final polymer composition is derived about half from the Ziegler-Natta catalyst and about half from the chromium catalyst. The advantage of the inventive step here, i.e., the addition of lithium cocatalyst, is that the melt indices of the two components are spread further apart than would normally be possible since an alkyl lithium cocatalyst can reduce the melt index of the chromium component. The overall melt index of the composite still can be controlled by adjusting the amount of hydrogen in the reactor.

TABLE 3

DUAL CATALYST SYSTEMS

| Run | 301 | 302 | 303 |
|-----|-----|-----|-----|
| grams of Cr catalyst charged | 0.0429 g | 0 g | 0.1197 g |
| grams of Ziegler-Natta catalyst charged | 0 g | 0.002 g | 0.004 g |
| grams of polymer formed: | 82.2 | 51.8 | 202.1 |
| Measured activity (gPE/gcat/h) | 3590 | 31000 | 1634 |
| High Load Melt Index g/10 min | 11.6 | 30.0 | 16.7 |
| HLMI/MI | 105.3 | 30.3 | — |
| Density g/cc | 0.938 | 0.958 | 0.948 |

While this invention has been described in detail for the purpose of illustration, it is not to be construed as limited thereby but is intended to cover all changes and modifications within the spirit and scope thereof.

That which is claimed is:

1. A catalyst composition comprising:
   1) the product resulting from the combination of:
      a) a chromium catalyst having a pore volume of at least 1.8 cc/g and a surface area of at least 400 m$^2$/g produced by contacting a chromium-containing, titanium-containing, silica-containing solid with carbon monoxide under conditions such that a substantial portion of the chromium is in the divalent state after contacting with carbon monoxide; and
      b) a cocatalyst, wherein the cocatalyst is an alkyl lithium or aryl lithium compound; and 2) a Ziegler-Natta catalyst composition produced by combining a halide of titanium, vanadium, or zirconium and an organoaluminum compound.

2. A catalyst composition according to claim 1 wherein said cocatalyst comprises an alkyl lithium compound.

3. A catalyst composition according to claim 2 wherein said alkyl lithium compound has 1 to 12 carbon atoms.

4. A catalyst composition according to claim 2 wherein said alkyl lithium compound has 1 to 5 carbon atoms.

5. A catalyst composition according to claim 4 wherein said alkyl lithium compound comprises n-butyl lithium.

6. A catalyst composition according to claim 5 wherein the alkyl lithium compound is used in an amount so as to give an atom ratio of lithium to chromium in the range of about 0.5:1 to 10:1.

7. A catalyst composition according to claim 5 wherein the chromium catalyst contains about 0.5 to about 5 weight percent chromium and about 0.1 to 7 weight percent titanium.

8. A composition according to claim 1 wherein said lithium compound is used in an amount so as to give an atom ratio of lithium to chromium within a range of about 0.5:1 to about 10:1.

9. A composition according to claim 1 wherein the chromium catalyst is prepared by calcining a chromium-containing, titanium-containing, silica-containing solid with oxygen at a temperature in the range of about 400 to about 900 degrees C. to convert a substantial portion of the chromium to the hexavalent state and then contacting the calcined product with carbon monoxide at a temperature in the range of about 300 to about 500 degrees C. to convert a substantial portion of the chromium to the divalent state.

10. A catalyst composition comprising:
1) the product resulting from the combination of:
   a) a chromium catalyst having a pore volume of at least 1.8 cc/g and a surface area of at least 400 $m^2/g$; and
   b) a cocatalyst, wherein the cocatalyst is an alkyl lithium or aryl lithium compounds; and
2) a Ziegler-Natta catalyst composition produced by combining a halide of titanium, vanadium, or zirconium and an organoaluminum compound;
   wherein the chromium catalyst consists essentially of a chromium-containing, titanium-containing, silica-containing solid that has been contacted with carbon monoxide under conditions such that a substantial portion of the chromium is in the divalent state after contacting with carbon monoxide.

* * * * *

UNITED STATES PATENT AND TRADEMARK OFFICE
CERTIFICATE OF CORRECTION

PATENT NO. : 6,828,268 B1
DATED : December 7, 2004
INVENTOR(S) : Max P. McDaniel et al.

It is certified that error appears in the above-identified patent and that said Letters Patent is hereby corrected as shown below:

<u>Column 9,</u>
Line 38, replace "NH" with -- MI --.

<u>Column 10,</u>
Line 34, delete "and iii) mixtures".
Line 40, delete "These results are again shown graphically in Fig. 1".

Signed and Sealed this

Thirteenth Day of June, 2006

JON W. DUDAS
*Director of the United States Patent and Trademark Office*